(12) United States Patent
Lapointe et al.

(10) Patent No.: US 6,219,966 B1
(45) Date of Patent: Apr. 24, 2001

(54) CONTAINER FOR HYDROPONIC CULTURE AND METHOD FOR MAKING SAME

(76) Inventors: Claude Lapointe, 3131, rue Dupuis, Sainte-Julienne, Québec (CA), J0K 2T0; Pierre Pichette, 4229, rue Vincent Massé, Rawdon, Québec (CA), J0K 1S0

( * ) Notice: Subject to any disclaimer, the term of this patent is extended or adjusted under 35 U.S.C. 154(b) by 0 days.

(21) Appl. No.: 09/235,920

(22) Filed: Jan. 25, 1999

(30) Foreign Application Priority Data

Jan. 26, 1998 (CA) ................................................ 2 228 071

(51) Int. Cl.[7] .................................................. A01G 31/00
(52) U.S. Cl. ............................................................ 47/62 C
(58) Field of Search ............................... 47/59, 60, 62 R, 47/62 A, 62 C, 62 E, 62 N

(56) References Cited

U.S. PATENT DOCUMENTS

| 4,310,990 | 1/1982 | Payne . |
| 4,399,634 | * 8/1983 | O'Hare ...................................... 47/59 |
| 4,669,217 | * 6/1987 | Fraze ........................................ 47/64 |
| 4,976,064 | 12/1990 | Julein . |
| 5,010,686 | 4/1991 | Rivest . |
| 5,067,275 | 11/1991 | Constance . |
| 5,381,626 | 1/1995 | Sherfield . |
| 5,385,589 | 1/1995 | Kratky . |
| 5,394,647 | 3/1995 | Blackford, Jr. . |
| 5,557,884 | * 9/1996 | Deppe .................................. 47/62 E |
| 5,996,280 | * 12/1999 | Michailiuk ............................... 47/86 |

FOREIGN PATENT DOCUMENTS

2050788A * 1/1981 (GB) .................................... 47/62 C

* cited by examiner

Primary Examiner—Charles T. Jordan
Assistant Examiner—Francis T. Palo
(74) Attorney, Agent, or Firm—Goudreau Gage Dubuc

(57) ABSTRACT

A container for hydroponic culture, a hydroponic culture system using such a container and a method for making such a container are described herein. The container has a semi-cylindrical body provided with longitudinal edges, edge clips mounted to the longitudinal edges and a semi-cylindrical cover removably mounted to the edge clips. The cover includes pot receiving apertures and may easily be removed from the edge clips for cleaning operations. End caps are provided to create a waterproof container.

19 Claims, 5 Drawing Sheets

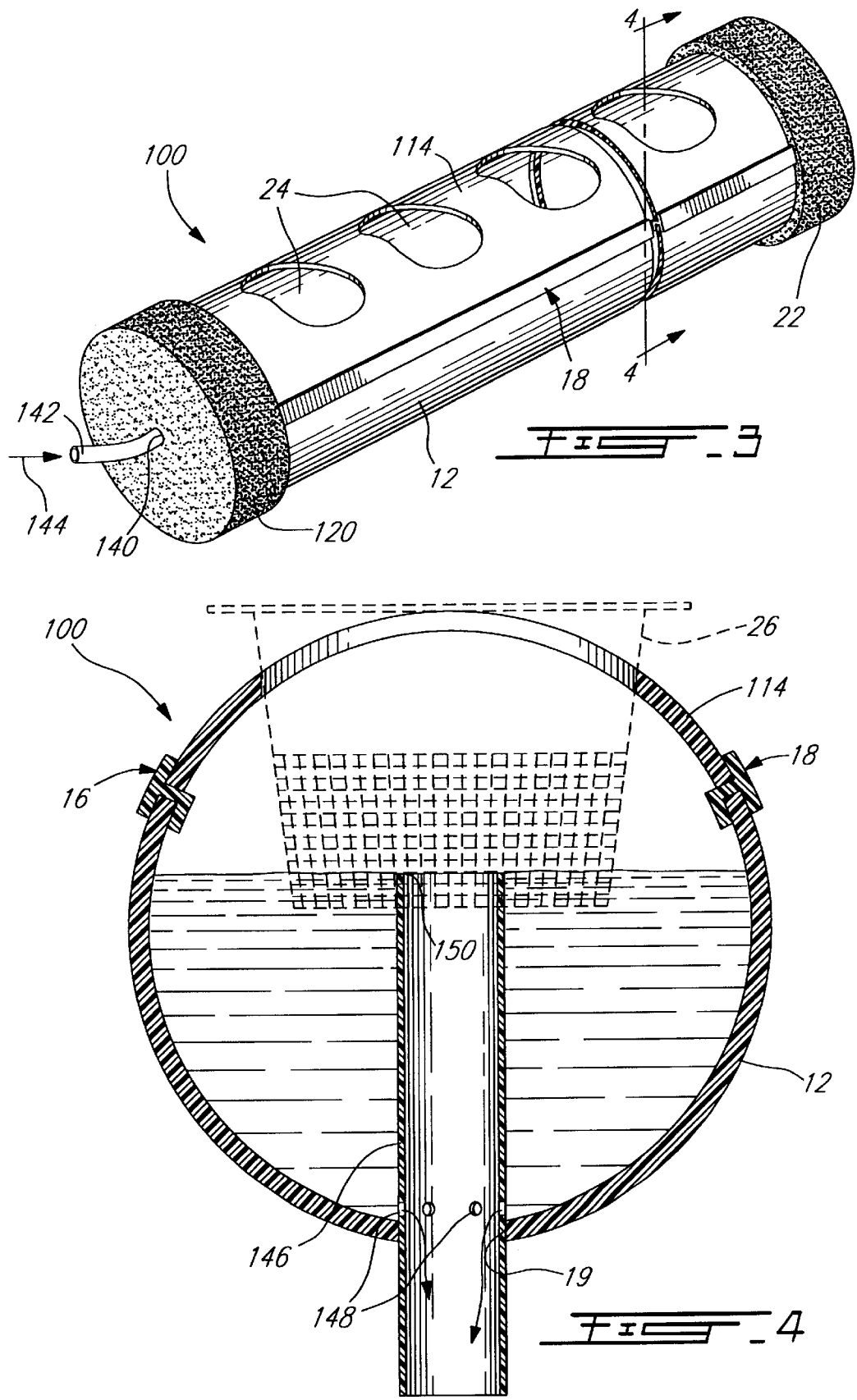

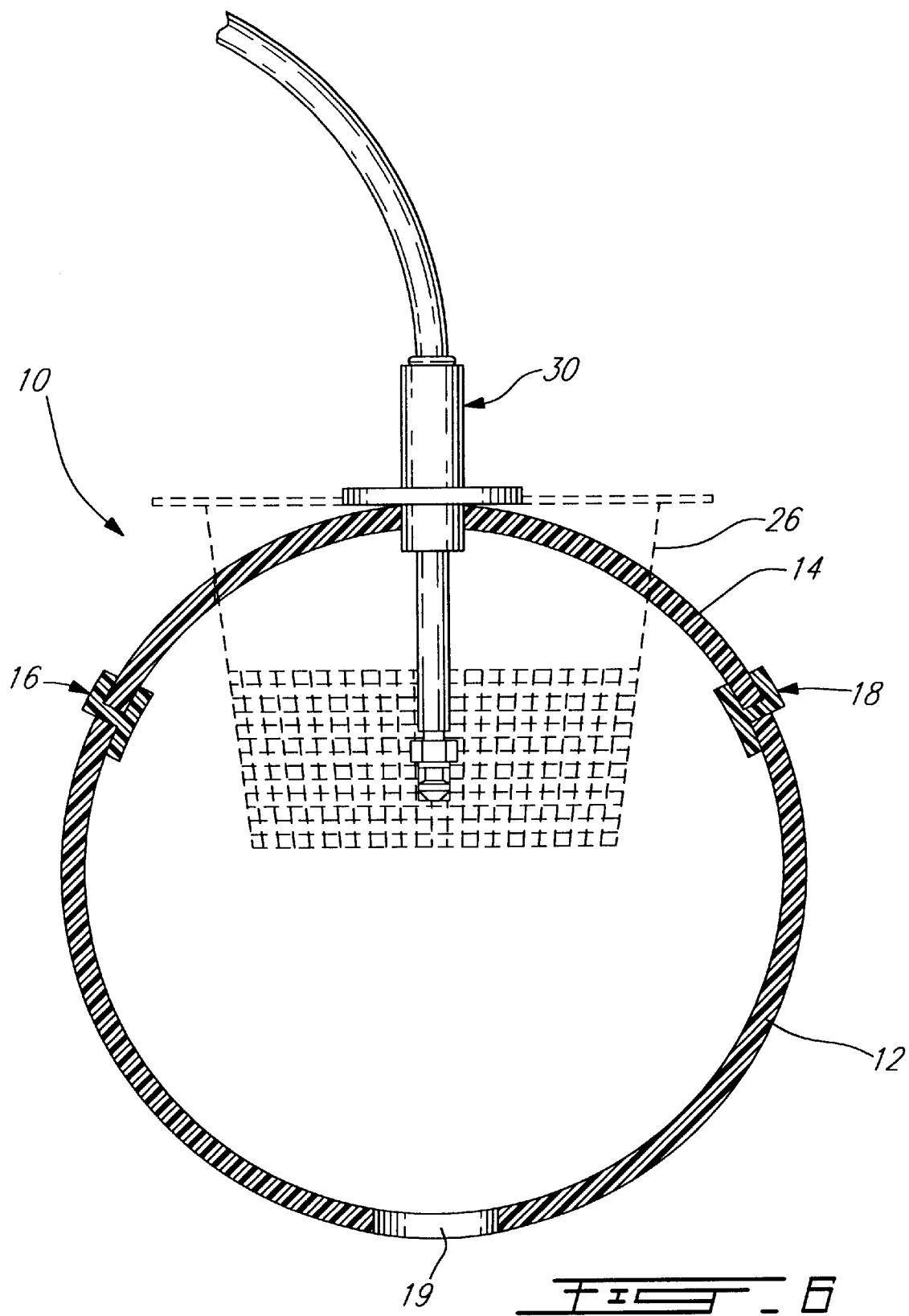

CONTAINER FOR HYDROPONIC CULTURE AND METHOD FOR MAKING SAME

FIELD OF THE INVENTION

The present invention generally relates to hydroponic culture. More specifically, the present invention is concerned with a container provided with a removable cover advantageous for hydroponic culture.

BACKGROUND OF THE INVENTION

Hydroponic culture is widely known as a method used for growing plants without soil, in which the plant roots are brought into contact with water containing dissolved nutrients. Small particles of a chemically inert material, such as, for example, expanded perlite or expanded clay, are generally provided in a net pot to support the roots. These particles provide a suitable growing environment for the plant roots and the net pot allows the water to adequately contact the roots.

Different methods exist to supply nutrient containing water to the roots of the plants.

A first method (generally referred to as NFT "Nutrient Film Technique") consists in the periodical flooding of the container with the nutrient containing water. This water is maintained in the container for a predetermined period and is then drained from the container.

A second method consists of continuously supplying minute quantity of the nutrient containing water to the roots. This can be done by allowing the water to drip continuously onto the particulate material or by providing a continuous small stream of water in contact with the particulate material.

A third method (generally referred to as aeroponic culture) consists in periodically spraying nutrient containing water onto the roots to keep them moist. In this method, humidified air provides the environment in which the plant roots grow.

While many types of containers may be used for the different classes of hydroponic culture generally defined hereinabove, it has been found that available containers usually suffer many drawbacks. For example, they may be difficult to clean between uses, may be designed for a single class of hydroponic culture and/or designed for a predetermined size of net pot.

OBJECTS OF THE INVENTION

An object of the present invention is therefore to provide an improved container for hydroponic culture.

SUMMARY OF THE INVENTION

More specifically, in accordance with the present invention, there is provided a container for hydroponic culture comprising:
   a longitudinal concave body having first and second longitudinal edges and first and second ends;
   first edge clip fixedly mounted to said first longitudinal edge;
   second edge clip fixedly mounted to said second longitudinal edge;
   a cover configured and sized to be removably mounted between said first and second edge clips; said cover including at least one plant receiving aperture.

According to another aspect of the present invention, there is provided a method for making a container for hydroponic culture comprising the steps of:
   providing a hollow cylindrical tube having a longitudinal axis;
   cutting said tube along a first hypothetical line generally parallel to said longitudinal axis;
   cutting said tube along a second hypothetical line generally parallel to said longitudinal axis; said second line being spaced apart from said first line; said second cutting operation separating said cylindrical tube into a semi-cylindrical body and a semi-cylindrical cover; said semi-cylindrical body being provided with first and second longitudinal edges;
   providing first and second generally h-shaped edge clips;
   mounting said first edge clip to said first edge;
   mounting said second edge clip to said second edge; and
   cutting at least one pot receiving aperture in the cover.

According to another aspect of the present invention, there is provided a hydroponic culture system comprising:
   at least one container for hydroponic culture including:
      a longitudinal concave body having first and second longitudinal edges and first and second ends;
      first edge clip fixedly mounted to said first longitudinal edge;
      second edge clip fixedly mounted to said second longitudinal edge; and
      a cover configured and sized to be removably mounted between said first and second edge clips; said cover including at least one plant receiving aperture; said cover also including at least one spray head receiving aperture;
   a support assembly to support said at least one container; and
   a fluid dispensing assembly including:
      a reservoir having an inlet and an outlet; one of said first and second end of each said at least one container being connected to said inlet of said reservoir;
      a pump having an inlet connected to outlet of said reservoir; said pump having an outlet;
      a tubular water delivery system having an inlet connected to said outlet of said pump; said tubular water delivery system having at least one outlet;
      at least one spray head; each said at least one spray head having an inlet connected to one of said at least one outlet of said tubular water delivery system and a spray outlet connected to one of said at least one spray head receiving aperture of said cover.

According to yet another embodiment of the present invention, there is provided a container for hydroponic culture comprising:
   a longitudinal concave body having first and second longitudinal body edges;
   a concave cover having first and second longitudinal cover edges and at least one plant receiving aperture;
   first edge clip fixedly mounted to the first longitudinal cover edge;
   second edge clip fixedly mounted to the second longitudinal cover edge; the first and second edge clips being configured and sized to be respectively removably connected to the first and second longitudinal body edges, thereby removably mounting the cover to the body.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 3 is a perspective view illustrating the container of FIG. 1 used for flood type hydroponic culture;

FIG. 4 is a sectional view taken along line 4—4 of FIG. 3;

FIG. 6 is a sectional view similar to FIG. 2 but illustrating a variant of the present invention.

DESCRIPTION OF THE PREFERRED EMBODIMENT

Figure 1:
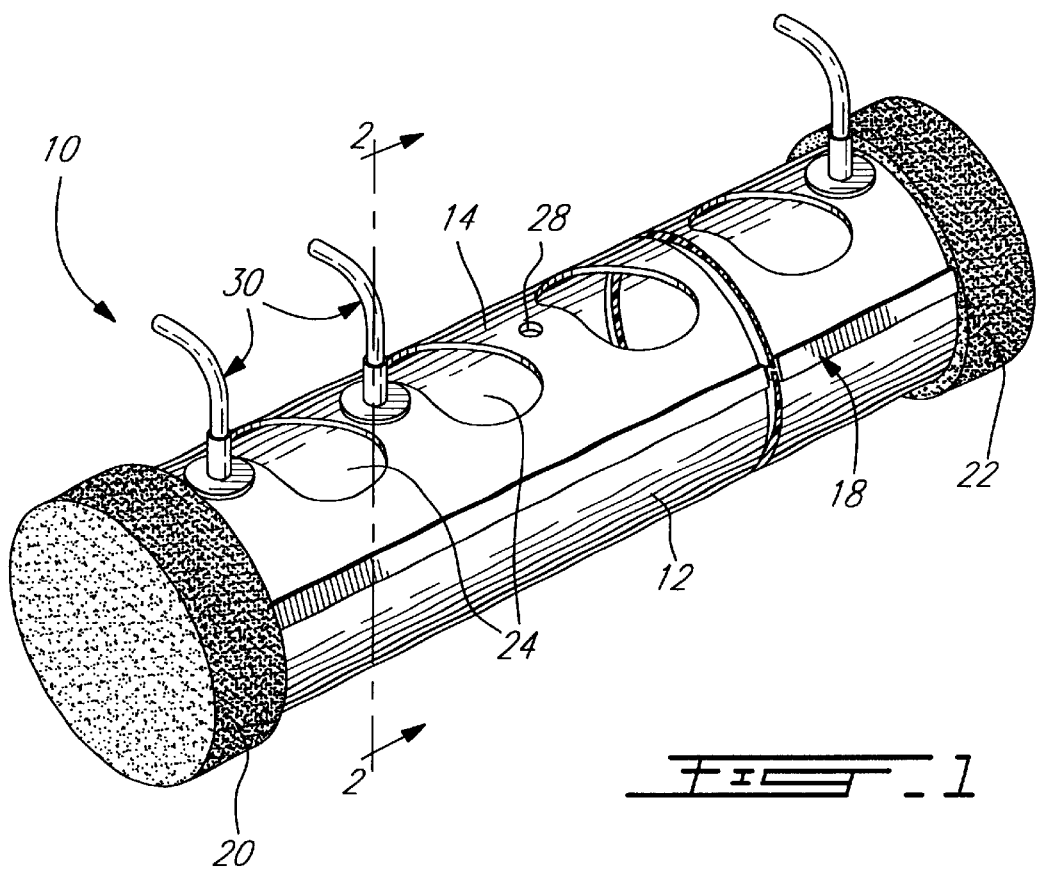
FIG. 1 is a perspective view illustrating a container for hydroponic culture according to the present invention, used for aeroponic culture.
Figure 2:
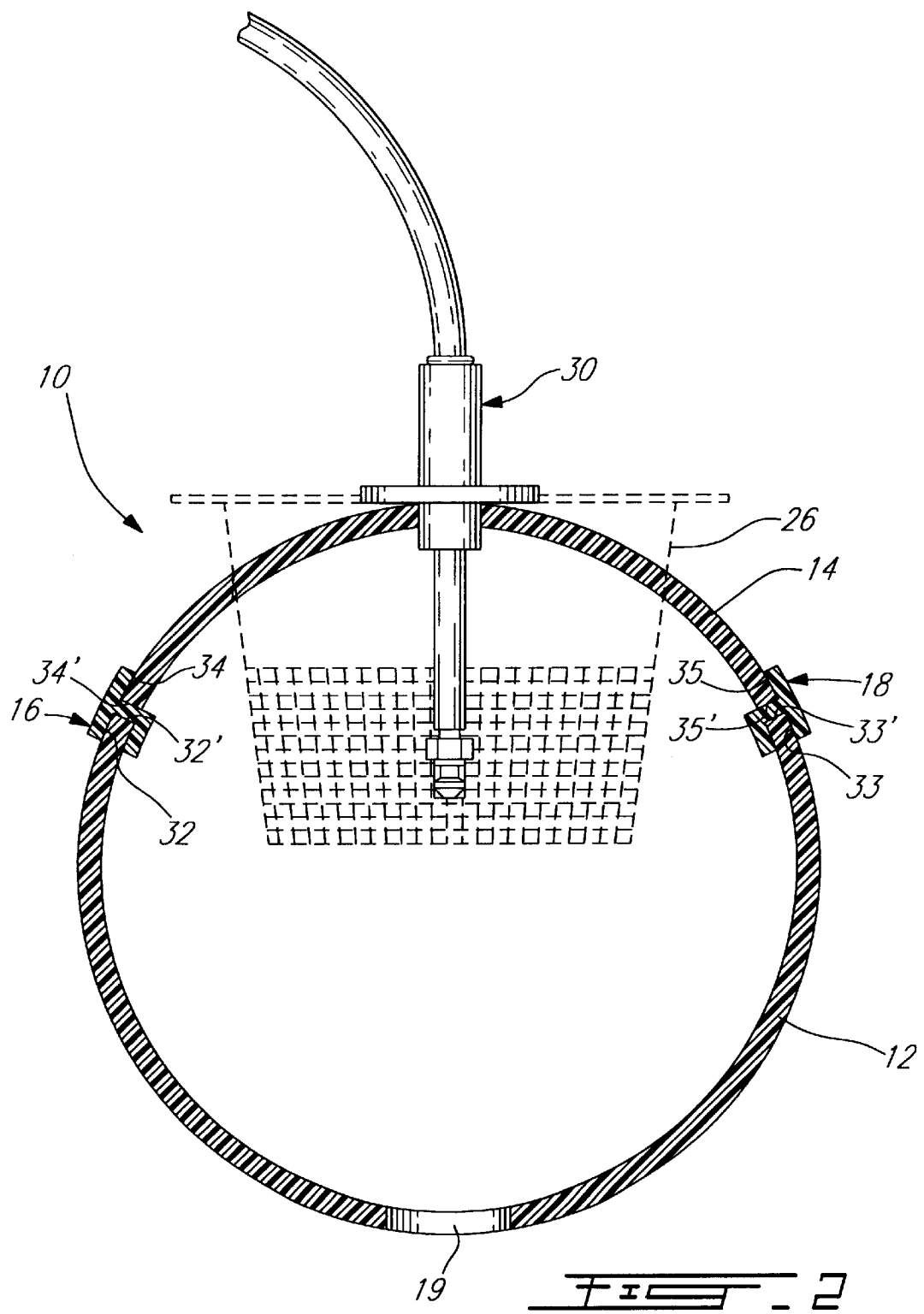
FIG. 2 is a sectional view taken along line 2—2 of FIG. 1.

Referring now to FIGS. 1 and 2 of the appended drawings, a tubular container 10 for hydroponic culture according to a preferred embodiment of the present invention will be described.

The tubular container 10 is particularly advantageous for aeroponic culture, i.e. the hydroponic culture where the nutrient containing water is periodically sprayed onto the roots of the plants to keep them moist. Of course, as will be easily understood by one skilled in the art upon reading the present description, the tubular container 10 could be used for all the above noted hydroponic cultures.

The tubular container 10 includes a semi-cylindrical body 12, a semi-cylindrical cover 14, first and second edge clips 16, 18 and first and second end caps 20, 22.

As can be better seen from FIG. 2, the body 12 and the cover 14, when assembled by the edge clips 16 and 18, generally form a container 10 having a circular cross-section.

The body 12 includes a drain aperture 19 provided to selectively allow water to be drained from the container 10 as will be explained hereinafter. Of course, a plug or a valve (not shown) may be inserted in the drain aperture to close it when required.

Returning to FIG. 1, the cover 14 includes a plurality of pot receiving apertures 24 configured and sized to receive conventional net pots 26, shown in dashed lines in FIG. 2, allowing nutrient containing water to be supplied from the sides of the pot 26. The cover 14 also includes a plurality of spray head apertures 28 configured and sized to allow conventional spraying heads 30 to be inserted therein.

The cover 14 is removably mounted to the body 12 via the first and second edge clips 16 and 18. As can be better seen from FIG. 2, these clips 16 and 18 have a generally h-shaped cross-section. A U-shaped portion 32 of clip 16 is mounted to the longitudinal edge 32' of the body 12 and a U-shaped portion 33 of clip 18 is mounted to the longitudinal edge 33' of the body 12. The edges 32' and 33' define a longitudinal opening of the body 12. The cover 14 is maintained to the cover 12 via respective walls 34, 35 of the clips 16 and 18 to thereby close the longitudinal opening of the body 12. More specifically, the cover 14 has a first longitudinal edge 34' contacting the wall 34 of the edge clip 16 and a second longitudinal edge 35' contacting the wall 35 of the edge clip 18.

As will be easily understood by one skilled in the art, an adhesive (not shown) may optionally be provided between the edges of the body 12 and the clips 16 and 18.

It is to be noted that the geometry of the clips 16,18, of the body 12 and of the cover 14 provides an adequate contact between the cover 14 and the clips 16 and 18 to maintain the cover 14 in its closed position while allowing the manual removal of the cover 14 from the clips 16 and 18 when the end caps 20 and 22 are removed from the ends of the container 10. Indeed, the cover 14 has to be slightly deformed from its semi-cylindrical "normal" state to be placed in contact with the walls 34 of both clips 16 and 18 simultaneously. This slight deformation improves the contact between the cover 14 and the walls 34. Of course, since containers designed for hydroponic culture are generally not subjected to extraordinary stresses, the above-mentioned deformation of the cover is not a requirement of the present invention.

It is also to be noted that the clips 16 and 18 or similar clips having the same functions could be integrally formed with the body 12.

It is also to be noted that the body 12 could be non semi-cylindrical as long as it defines a concave shape to allow the pots 26 to be in contact with water while allowing easy drainage. Similarly, the cover 14 could be non semi-cylindrical as long as it positively engages the clips 16 and 18 to thereby adequately close the longitudinal opening of the body 12.

Since the principles of the aeroponic method of hydroponic culture is believed well known to those skilled in the art and are not within the scope of the present invention, they will not be explained in greater details herein.

A method to manufacture a container 10, described hereinabove will now be described. This method includes the following steps:

a) providing a hollow cylindrical tube having a longitudinal axis;

b) cutting the tube along a first hypothetical line generally parallel to the longitudinal axis of the tube;

c) cutting the tube along a second hypothetical line generally parallel to the longitudinal axis; the second line being spaced apart from the first line; the second cutting operation separating the cylindrical tube into a semi-cylindrical body and a semi-cylindrical cover; the semi-cylindrical body being provided with first and second longitudinal edges;

d) providing first and second generally h-shaped longitudinal edge clips;

e) mounting the first edge clip to the first edge;

f) mounting the second edge clip to the second edge; and g) cutting pot receiving apertures in the cover and optionally other openings in the cover and/or the body.

It is to be noted that the method steps b and c could be replaced by the step of cutting the tube along a hypothetical plane generally parallel to the longitudinal axis of the tube to separate the cylindrical tube into a semi-cylindrical body and a semi-cylindrical cover; the semi-cylindrical body being provided with first and second longitudinal edges. Of course, if this is the case, the cross-section of the clips 16 and 18 could advantageously be modified to better fit the edges.

It is to be noted that the order of execution of the steps e, f and g is not critical.

Of course, as will be easily understood by one skilled in the art of extrusion, the body 12 and the cover 14 could be formed by an extrusion process. Similarly, the clips 16 and 18 could be integrally formed with the body 12.

The tubular container 10 has the principal advantage that it may easily be disassembled for cleaning between uses. Indeed, the body 12 may become soiled during use and in need to be cleaned before re-use. The tubular container 10 is advantageously made of plastic material Another advantage of the tubular container 10 is that it is possible to provide different covers (not shown) having net pot receiving apertures in different sized and configuration. This is a major advantage since the user may use the container 10 for growing different type of plants by changing only the cover of the container, therefore lowering the total cost to the user. Furthermore, as will be discussed hereinbelow with respect to FIG. 5, another advantage of the tubular container of the present invention is that it is possible to join similar containers 10 end to end by replacing the covers by waterproof connectors.

Figure 5:
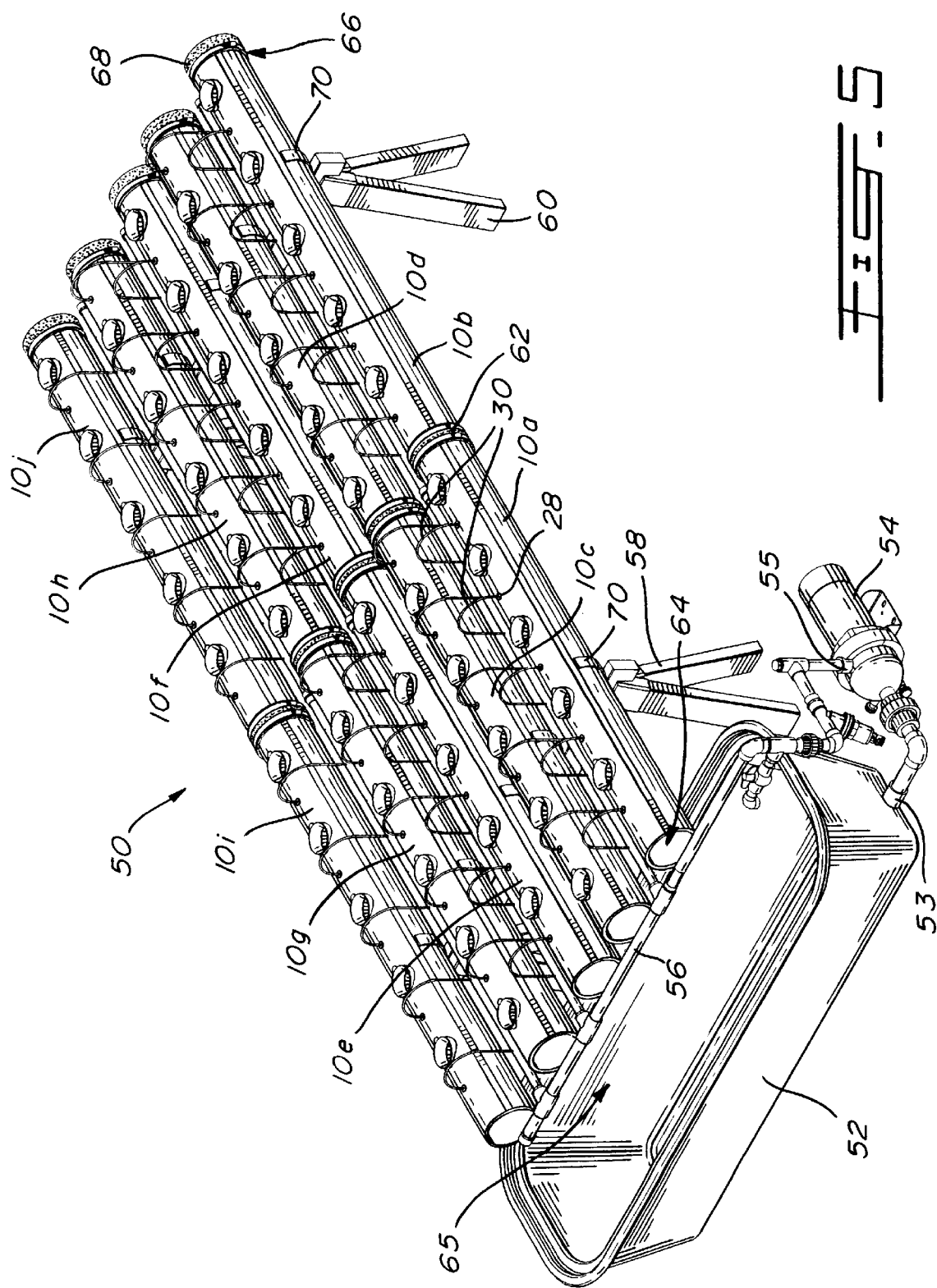
FIG. 5 is a perspective view of a aeroponic culture system using containers according to the present invention.

Turning now to FIG. 5 of the appended drawings, a hydroponic system 50 using tubular containers 10 will be described.

The hydroponic system 50 is an aeroponic system comprising a nutrient containing water reservoir 52, a pump 54 having an inlet connected to an outlet 53 of the reservoir 52, a tubular water delivery system 56 connected to an outlet 55 of the pump 54, first and second supports 58, 60 supporting ten (10) tubular containers 10a–10j and a plurality of spraying heads 30 interconnecting the outlets of the tubular assembly 56 and the spray head apertures 28 of containers 10a–10j.

The reservoir 52, the pump 54, the tubular water delivery system 56 and the plurality of spraying heads 30 define a fluid dispensing assembly. Similarly the first and second supports 58 and 60 define a container support assembly.

It is to be noted that only the containers 10a and 10b will be described in greater details hereinbelow since the other containers 10c–10j are similarly assembled.

Tubular containers 10a and 10b are mounted end to end via a waterproof connector 62 to form a container unit. The waterproof connector 62 allows fluid to go from container 10b to container 10a. The proximate end 64 of the container 10a is left open to allow fluid to drain in the inlet 65 of the reservoir 52 while the distal end 66 of the container 10b is closed by an end cap 22.

Of course, depending on the length of the tubes used to form the tubular containers, each container unit could be made of a single tubular container or of more than two such containers.

The tubes forming the tubular water delivery system 56 are provided with a plurality of water delivery apertures that are fitted with water spraying heads 30 transferring nutrient containing water from the system 56 to the containers 10.

To ensure that the excess water sprayed in the containers 10 returns to the reservoir 52, the second support 60 is slightly higher than the first support 58.

The containers 10 are mounted to the supports 58 and 60 via C-shaped connectors 70 that allow easy installation and removal of containers.

Turning now to FIGS. 3 and 4 of the appended drawings, a tubular container 100 for hydroponic culture according to a second embodiment of the present invention will be described.

Since the tubular containers 10 and 100 are very similar only the differences between these containers will be described hereinafter. Furthermore, the same elements of these containers are given the same reference numerals.

The main difference between the container 10 of FIGS. 1 and 2 and the container 100 of FIGS. 3 and 4 is that container 100 is specifically designed for NFT type hydroponic culture. More specifically, the container 100 is designed to allow periodic flooding of the body 12. Accordingly, the cover 114 does not include the apertures 28 of the cover 14 allowing the installation of the spraying heads 30 since no spraying heads are required.

The end cap 120 is provided with an inlet aperture 140 into which a tube 142 may be inserted to supply nutrient containing water (see arrow 144) via a pump (not shown) at predetermined intervals to flood the container 100.

To control the level of flooding of the body 12 with nutrient containing water from the body 12, a drain tube 146 is inserted in the drain aperture 19 (see FIG. 4) of the body 12. The level of water in the body 12 will rise until the end 150 of the drain tube is reached. The drain tube 146 includes small peripheral apertures 148 allowing water to be slowly drained from the body 12. Since the flow of water supplied via the inlet 140 is greater than the flow of water allowed to drain via the apertures 148, the level of water in the body 12 will rise until it reaches the open upper end 150 of the drain tube 146. The level of water may be maintained at this level for a predetermined period of time by the continuous supply of water from the inlet 140. When the predetermined period is over, the pump (not shown) may be stopped to thereby cause the level of water in the body 12 to slowly decrease.

It is to be noted that the length of the drain tube 146 may be modified according to the required level of fluid in the body 12.

Again, since the principles of the NFT method of hydroponic culture is believed well known to those skilled in the art and are not within the scope of the present invention, they will not be explained in greater details herein.

The steps to manufacture a container 100 are similar to the steps mentioned hereinabove to manufacture a container 10 and will therefore not be repeated herein.

An advantage of the container 100 is that the cover 114 may be installed upside down onto the body 12 to allow the reduction of the amount of nutrient containing water required to flood the body 12. Of course, if the cover 114 is installed upside down, the length of the drain tube 146 will be modified accordingly.

It is to be noted that the tubular container 10, illustrated in FIGS. 1–2, could easily be modified to be used in a similar fashion. Indeed, the apertures 28 of the cover 14 could be left open or closed by caps, a drain tube 146 could be installed in the drain aperture 19 and an aperture 140 could be made in the end cap 20.

It is also to be noted that the either one of the containers 10 and 100 could be used for hydroponic culture where a minute quantity of nutrient containing water is continuously supplied to the roots of the plants.

Turning now briefly to FIG. 6 of the appended drawings, a variant of the installation of the clips 16 and 18 will be described. In this figure, the clips 16 and 18 are shown mounted to the edges of the cover 14 instead of the edges of the body 12. As will be easily understood by one skilled in the art, the assembly of the container 10 from the body 12 and the cover 14 is not significantly modified by the mounting of the clips to the cover instead as to the body.

Of course, as will be easily understood by one skilled in the art, the connections between the various elements of the tubular container of the present invention are advantageously waterproof.

It is to be noted that while the first and second edge clips 16, 18 are described herein as spanning the entire length of the containers 10 and 100, these clips could be provided at predetermined intervals along the containers. Of course, the seal between the body 12 and the cover 14 should be kept generally waterproof to prevent water from leaking from the container 10.

Although the present invention has been described hereinabove by way of preferred embodiments thereof, it can be modified, without departing from the spirit and nature of the subject invention as defined in the appended claims.

What is claimed is:

1. A container for hydroponic culture comprising:
   a longitudinal concave body having first and second longitudinal edges and first and second ends;
   first edge clip fixedly mounted to said first longitudinal edge;
   second edge clip fixedly mounted to said second longitudinal edge;
   a cover configured and sized to be removably mounted between said first and second edge clips; said cover including at least one plant receiving aperture and at least one spray head aperture configured and sized to receive a spray head.

2. A container for hydroponic culture as recited in claim 1, wherein said longitudinal concave body is semi-cylindrical.

3. A container of hydroponic culture as recited in claim 1, wherein said cover is semi-cylindrical.

4. A container for hydroponic culture as recited in claim 1, wherein said first and second edge clips are longitudinal.

5. A container for hydroponic culture as recited in claim 4, wherein said first and second longitudinal edge clips are integral with said body.

6. A container for hydroponic culture as recited in claim 1, wherein said first and second clips present a generally h-shaped cross-section.

7. A container for hydroponic culture as recited in claim 1 further comprising first end cap releasably sealing said first end of said body; and second end cap means for releasably sealing said second end of said body.

8. A container for hydroponic culture as recited in claim 7, wherein at least one of said first and second end caps includes an inlet aperture.

9. A container for hydroponic culture as recited in claim 8, wherein said body includes an outlet aperture.

10. A container for hydroponic culture as recited in claim 1, wherein both said body and said cover are made of plastic material.

11. A method for making a container for hydroponic culture comprising the steps of:
    providing a hollow cylindrical tube having a longitudinal axis;
    cutting said tube along a first hypothetical line generally parallel to said longitudinal axis;
    cutting said tube along a second hypothetical line generally parallel to said longitudinal axis; said second line being spaced apart from said first line; said second cutting operation separating said cylindrical tube into a semi-cylindrical body and a semi-cylindrical cover; said semi-cylindrical body being provided with first and second longitudinal edges;
    providing first and second generally h-shaped edge clips;
    mounting said first edge clip to said first edge;
    mounting said second edge clip to said second edge; and
    cutting at least one pot receiving aperture in the cover.

12. A method for making a container for hydroponic culture as recited in claim 11, further comprising the step of cutting at least one spray head aperture in the cover.

13. A hydroponic culture system comprising:
    at least one container for hydroponic culture including:
      a longitudinal concave body having first and second longitudinal edges and first and second ends;
      first edge clip fixedly mounted to said first longitudinal edge;
      second edge clip fixedly mounted to said second longitudinal edge; and
      a cover configured and sized to be removably mounted between said first and second edge clips; said cover including at least one plant receiving aperture; said cover also including at least one spray head receiving aperture;
    a support assembly to support said at least one container; and
    a fluid dispensing assembly including:
      a reservoir having an inlet and an outlet; one of said first and second end of each said at least one container being connected to said inlet of said reservoir;
      a pump having an inlet connected to outlet of said reservoir; said pump having an outlet;
      a tubular water delivery system having an inlet connected to said outlet of said pump; said tubular water delivery system having at least one outlet;
      at least one spray head; each said at least one spray head having an inlet connected to one of said at least one outlet of said tubular water delivery system and a spray outlet connected to one of said at least one spray head receiving aperture of said cover.

14. A hydroponic culture system as recited in claim 13, wherein said support assembly supports said at least one container so that one of said first and second end thereof is positioned directly above said inlet of said reservoir.

15. A hydroponic culture system as recited in claim 13, wherein said longitudinal concave body of said at least one container is semi-cylindrical.

16. A hydroponic culture system as recited in claim 13, wherein said cover of said at least one container is semi-cylindrical.

17. A hydroponic culture system as recited in claim 13, wherein said first and second edge clips are longitudinal.

18. A hydroponic culture system as recited in claim 13, wherein said first and second longitudinal edge clips are integral with said body.

19. A hydroponic culture system as recited in claim 13, wherein said first and second clips present a generally h-shaped cross-section.

* * * * *